United States Patent
Chang et al.

(10) Patent No.: US 12,556,231 B2
(45) Date of Patent: Feb. 17, 2026

(54) METHOD AND APPARATUS FOR SUPPORTING FAST MOBILITY IN COMMUNICATION SYSTEM

(71) Applicant: ELECTRONICS AND TELECOMMUNICATIONS RESEARCH INSTITUTE, Daejeon (KR)

(72) Inventors: Kap Seok Chang, Daejeon (KR); Yong Sun Kim, Daejeon (KR); Jun Hyeong Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 331 days.

(21) Appl. No.: 18/493,629

(22) Filed: Oct. 24, 2023

(65) Prior Publication Data

US 2024/0137072 A1 Apr. 25, 2024
US 2024/0235617 A9 Jul. 11, 2024

(30) Foreign Application Priority Data

Oct. 24, 2022 (KR) .................. 10-2022-0137518

(51) Int. Cl.
H04L 5/00 (2006.01)
H04B 7/01 (2006.01)
H04W 56/00 (2009.01)

(52) U.S. Cl.
CPC ............ *H04B 7/01* (2013.01); *H04L 5/0051* (2013.01); *H04W 56/0015* (2013.01)

(58) Field of Classification Search
CPC ..................................... H04L 5/0051
USPC ......................................... 370/329
See application file for complete search history.

(56) References Cited

U.S. PATENT DOCUMENTS

| | | |
|---|---|---|
| 8,355,675 B2 | 1/2013 | Roh et al. |
| 9,735,842 B2 | 8/2017 | Kim et al. |
| 9,749,170 B2 | 8/2017 | You |
| 9,768,898 B2 | 9/2017 | Hwang et al. |
| 10,693,523 B2 | 6/2020 | Kim et al. |
| 2014/0133413 A1 | 5/2014 | Kim et al. |
| 2022/0132593 A1 | 4/2022 | Ren et al. |

FOREIGN PATENT DOCUMENTS

WO 2010/006114 A2 1/2010

Primary Examiner — Angel T Brockman

(57) ABSTRACT

Disclosed are a method and an apparatus for supporting high-speed mobility in a communication. A method of a terminal may comprise: estimating a first frequency offset based on a downlink transmission received from a base station; estimating first time-varying characteristic information based on the downlink transmission; and transmitting, to the base station, a first uplink transmission including time-varying characteristic feedback information based on the first time-varying characteristic information and a configured time-varying characteristic information feedback condition.

20 Claims, 9 Drawing Sheets

METHOD AND APPARATUS FOR SUPPORTING FAST MOBILITY IN COMMUNICATION SYSTEM

CROSS-REFERENCE TO RELATED APPLICATIONS

This application claims priority to Korean Patent Applications No. 10-2022-0137518, filed on Oct. 24, 2022, with the Korean Intellectual Property Office (KIPO), the entire contents of which are hereby incorporated by reference.

BACKGROUND

1. Technical Field

Exemplary embodiments of the present disclosure relate to a technique for supporting high-speed mobility in a communication system, and more specifically, to a transmission and reception technique for improving demodulation performance in an environment where both of a carrier frequency offset (CFO) and a Doppler shift (DS) exist.

2. Related Art

With the development of information and communication technology, various wireless communication technologies have developed. Typical wireless communication technologies include long term evolution (LTE), new radio (NR), 6th generation (6G) communication, and/or the like. The LTE may be one of 4th generation (4G) wireless communication technologies, and the NR may be one of 5th generation (5G) wireless communication technologies.

In a communication system, even in an environment where a carrier frequency offset (CFO) does not exist, a terminal may move at high speed, and thus a high Doppler shift (DS) may occur. The communication system may experience deterioration in performance due to the effects of high DS. Accordingly, techniques to improve the performance of the communication system are required.

SUMMARY

Exemplary embodiments of the present disclosure are directed toward providing a method and an apparatus for supporting high-speed mobility, aiming to mitigate the impact of CFO and DS on downlink (DL) and uplink (UL) performance.

According to a first exemplary embodiment of the present disclosure, a method of a terminal may comprise: receiving a first downlink (DL) transmission from a base station; estimating a first frequency offset (FO) based on the first DL transmission; estimating first time-varying characteristic information based on the first DL transmission; transmitting, to the base station, a first uplink (UL) transmission including time-varying characteristic feedback information based on the first time-varying characteristic information and a configured time-varying characteristic information feedback condition; receiving, from the base station, a second DL transmission including Doppler shift (DS) feedback information generated in consideration of the time-varying characteristic feedback information; and performing a reception operation for a third DL transmission based on the Doppler shift feedback information included in the second DL transmission.

The first DL transmission may include at least one of a synchronization signal (SS), a reference signal (RS), a data channel, or a control channel, and at least one of the SS or RS included in the first DL transmission may be used to estimate the first FO.

At least one of the SS or RS included in the first DL transmission may be compensated based on the first FO.

The first FO may be estimated as a sum of a carrier frequency offset (CFO) in the first DL transmission and a Doppler shift (DS) in the first DL transmission.

The time-varying characteristic information feedback condition may be a condition for determining whether the first time-varying characteristic information is greater than or equal to a time-varying characteristic information threshold, and the time-varying characteristic information threshold may be a predetermined value or a value set by the base station.

The first UL transmission may include at least one of a preamble, a reference signal, a data channel, or a control channel.

The time-varying characteristic feedback information may indicate whether the time-varying characteristic information feedback condition is satisfied, and the time-varying characteristic feedback information may be included in a data channel or control channel included in the first UL transmission.

When the DS feedback information includes information on an estimated DS, the second DL transmission may be compensated based on the estimated DS and transmitted to the terminal.

When the DS feedback information includes information indicating to ignore an estimated DS, the second DL transmission may be transmitted to the terminal without compensation for a DS between the base station and the terminal.

According to a second exemplary embodiment of the present disclosure, a method of a terminal may comprise: receiving a first downlink (DL) transmission from a base station; estimating a first frequency offset (FO) based on the first DL transmission; transmitting, to the base station, a first uplink (UL) transmission frequency pre-shifted by twice the first FO; receiving, from the base station, a second DL transmission including carrier frequency offset (CFO) feedback information; and performing a reception operation for a third DL transmission based on the CFO feedback information included in the second DL transmission.

The first DL transmission may include at least one of a synchronization signal (SS), a reference signal (RS), a data channel, or a control channel, and at least one of the SS or RS included in the first DL transmission may be used to estimate the first FO.

At least one of the SS or RS included in the first DL transmission may be compensated based on the first FO.

The first FO may be estimated as a sum of a carrier frequency offset (CFO) in the first DL transmission and a Doppler shift (DS) in the first DL transmission.

The first UL transmission may include at least one of a preamble, a reference signal, a data channel, or a control channel.

The CFO feedback information may include at least one of information indicating to ignore an estimated CFO or information on the estimated CFO, and the CFO feedback information may be included in a data channel included in the second DL transmission.

When the CFO feedback information includes information indicating to ignore an estimated CFO, the second DL transmission may be transmitted to the terminal without compensation for a CFO between the base station and the terminal.

According to a third exemplary embodiment of the present disclosure, a method of a base station may comprise: transmitting a first downlink (DL) transmission to a terminal; receiving a first uplink (UL) transmission including time-varying characteristic feedback information from the terminal; estimating a Doppler shift (DS) based on the time-varying characteristic feedback information; transmitting, to the terminal, a second DL transmission including DS feedback information generated in consideration of the time-varying characteristic feedback information; and transmitting, to the terminal, a third DL transmission based on the DS feedback information included in the second DL transmission.

The first DL transmission may include at least one of a synchronization signal (SS), a reference signal (RS), a data channel, or a control channel.

The DS feedback information may include at least one of estimated DS information including an estimated DS or information indicating to ignore an estimated DS.

When the DS feedback information includes information indicating to ignore an estimated DS, the second DL transmission may be transmitted to the terminal without compensation for a DS between the base station and the terminal.

According to exemplary embodiment of the present disclosure, a carrier frequency offset (CFO) and Doppler shift (Doppler, DS) that affect reception of DL signals and UL signals can be effectively removed. Accordingly, improved performance of high-speed mobility in communication systems can be expected.

DETAILED DESCRIPTION

Figure 1:
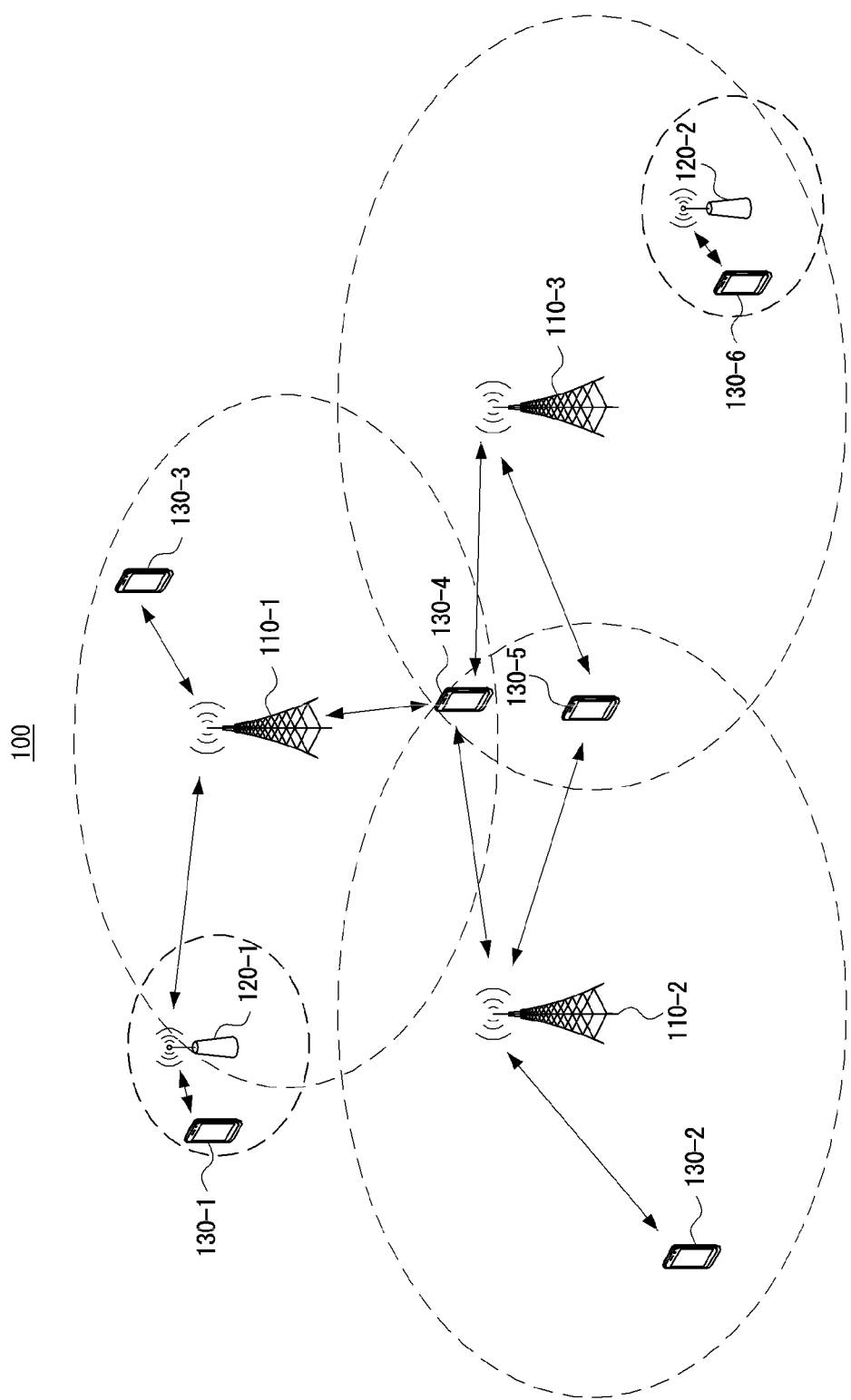
FIG. 1 is a conceptual diagram illustrating an exemplary embodiment of a communication system.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

In the present disclosure, "an operation (e.g. transmission operation) is configured" may mean that "configuration information (e.g. information element(s) or parameter(s)) for the operation and/or information indicating to perform the operation is signaled". "Information element(s) (e.g. parameter(s)) are configured" may mean that "corresponding information element(s) are signaled". In the present disclosure, signaling may be at least one of system information (SI) signaling (e.g. transmission of system information block (SIB) and/or master information block (MIB)), RRC signaling (e.g. transmission of RRC parameters and/or higher layer parameters), MAC control element (CE) signaling, or PHY signaling (e.g. transmission of downlink control information (DCI), uplink control information (UCI), and/or sidelink control information (SCI)).

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSDPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present disclosure, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and redundant descriptions for the same elements are omitted.

FIG. 1 is a conceptual diagram illustrating an exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above as well as the frequency band of 6 GHz or below.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
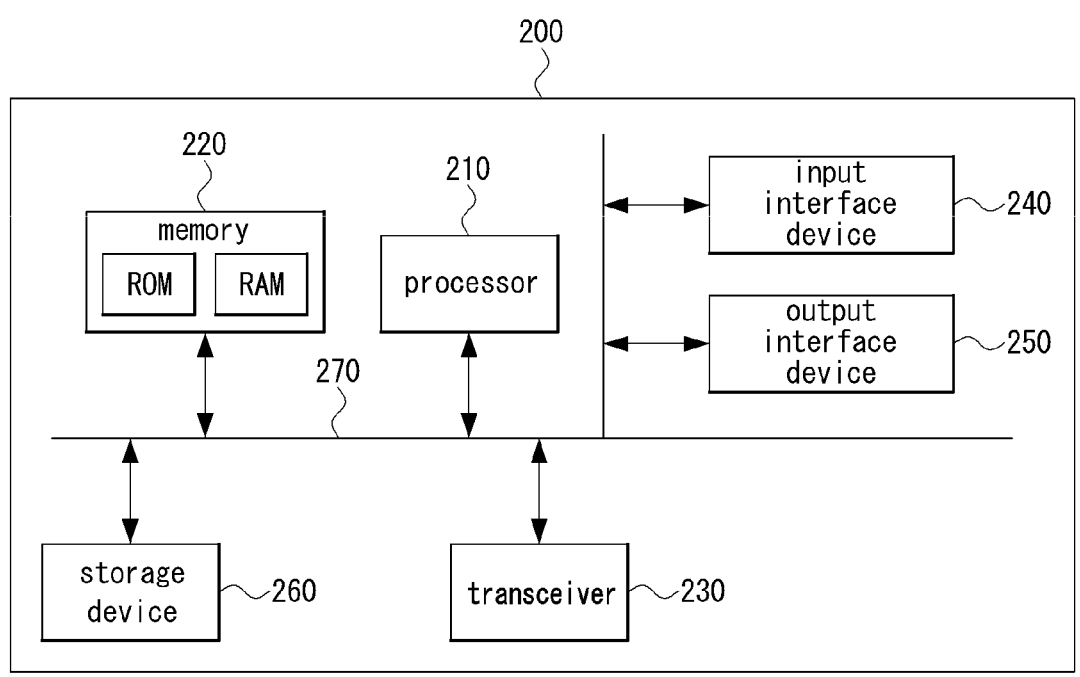
FIG. 2 is a block diagram illustrating an exemplary embodiment of a communication node constituting a communication system.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods for configuring and managing radio interfaces in a communication system will be described. Even when a method (e.g., transmission or reception of a signal) performed at a first communication node among communication nodes is described, the corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

Meanwhile, in a communication system, a base station may perform all functions (e.g., remote radio transmission/reception function, baseband processing function, and the like) of a communication protocol. Alternatively, the remote radio transmission/reception function among all the functions of the communication protocol may be performed by a transmission reception point (TRP) (e.g., flexible (f)-TRP), and the baseband processing function among all the functions of the communication protocol may be performed by a baseband unit (BBU) block. The TRP may be a remote radio head (RRH), radio unit (RU), transmission point (TP), or the like. The BBU block may include at least one BBU or at least one digital unit (DU). The BBU block may be referred to as a 'BBU pool', 'centralized BBU', or the like. The TRP may be connected to the BBU block through a wired fronthaul link or a wireless fronthaul link. The communication system composed of backhaul links and fronthaul links may be as follows. When a functional split scheme of the communication protocol is applied, the TRP may selectively perform some functions of the BBU or some functions of medium access control (MAC)/radio link control (RLC) layers.

Figure 3:
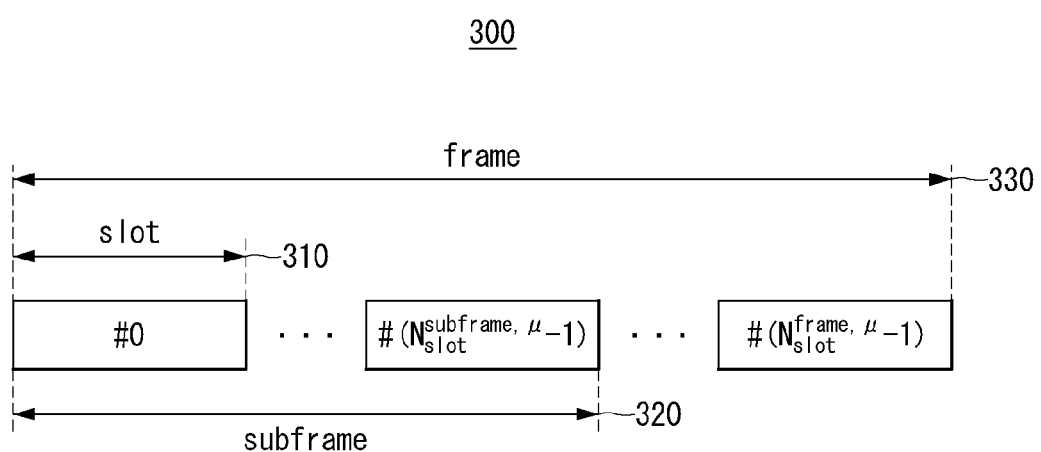
FIG. 3 is a conceptual diagram illustrating an exemplary embodiment of a structure of a radio frame in a communication system.

FIG. 3 is a conceptual diagram illustrating an exemplary embodiment of a structure of a radio frame in a communication system.

Referring to FIG. 3, in the communication system, one radio frame may consist of 10 subframes, and one subframe may consist of 2 time slots. One time slot may have a plurality of symbols in the time domain and may include a plurality of subcarriers in the frequency domain. The plurality of symbols in the time domain may be OFDM symbols. For convenience, an exemplary embodiment of a radio frame structure in the communication system will be described below using an OFDM transmission mode in which the plurality of symbols in the time domain are OFDM symbols as an example. However, this is merely an example for convenience of description, and exemplary embodiments of the radio frame structure in the communication system are not limited thereto. For example, various exemplary embodiments of the radio frame structure in the communication system may be configured to support other transmission modes, such as a single carrier (SC) transmission mode.

In a communication system to which the 5G communication technology, etc. is applied, one or more of numerologies of Table 1 may be used in accordance with various purposes, such as inter-carrier interference (ICI) reduction according to frequency band characteristics, latency reduction according to service characteristics, and the like.

TABLE 1

| μ | Δf = $2^μ$ · 15 [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Table 1 is merely an example for convenience of description, and exemplary embodiments of numerologies used in the communication system may not be limited thereto. Each numerology μ may correspond to information of a subcarrier spacing (SCS) Δf and a cyclic prefix (CP). The terminal may identify values of the numerology μ and CP applied to a downlink bandwidth part or uplink bandwidth part based on higher layer parameters such as 'subcarrierSpacing' and 'cyclicPrefix'.

Time resources in which radio signals are transmitted in a communication system 300 may be represented with a frame 320 comprising one or more $$\left(N_{slot}^{frame,\mu}/N_{slot}^{subframe,\mu}\right)$$

subframes, a subframe 320 comprising one or more $$\left(N_{slot}^{subframe,\mu}\right)$$

slots, and a slot 310 comprising 14

$$\left(N_{symb}^{slot}\right)$$

OFDM symbols. In this case, according to a configured numerology, as the values of $$N_{symb}^{slot}, N_{slot}^{subframe,\mu}, \text{ and } N_{slot}^{frame,\mu},$$

values according to Table 2 below may be used in case of a normal CP, and values according to Table 3 below may be used in case of an extended CP. The OFDM symbols included within one slot may be classified into 'downlink', 'flexible', or 'uplink' by higher layer signaling or a combination of higher layer signaling and L1 signaling.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

In an exemplary embodiment of a communication system, the frame 330 may have a length of 10 ms, and the subframe 320 may have a length of 1 ms. Each frame 330 may be divided into two half-frames having the same length, and the first half-frame (i.e. half-frame 0) may be composed of subframes #0 to #4, and the second half-frame (i.e. half-frame 1) may be composed of subframes #5 to #9. One carrier may include a set of frames for uplink (i.e. uplink frames) and a set of frames for downlink (i.e. downlink frames).

One slot may have 6 (i.e. extended cyclic prefix (CP) case) or 7 (i.e. normal CP case) OFDM symbols. A time-frequency region defined by one slot may be referred to as a resource block (RB). When one slot has 7 OFDM symbols, one subframe may have 14 OFDM symbols (i.e. l=0, 1, 2, . . . , 13).

The subframe may be divided into a control region and a data region. A physical downlink control channel (PDCCH) may be allocated to the control region. A physical downlink shared channel (PDSCH) may be allocated to the data region. Some of the subframes may be special subframes. The special subframe may include a downlink pilot time slot (DwPTS), a guard period (GP), and an uplink pilot time slot (UpPTS). The DwPTS may be used for time and frequency synchronization estimation and cell search of the terminal. The GP may be a period for avoiding interferences caused by multipath delays of downlink signals.

In an exemplary embodiment of the communication system, a first radio signal may be used for time and frequency synchronization estimation, and the like. The first radio signal may be configured based on at least one sequence. The at least one sequence constituting the first radio signal may be arranged in the frame 330, subframe 320, slot 310, or OFDM symbol(s) constituting the slot 310 in the time domain. Meanwhile, the at least one sequence constituting the first radio signal may be modulated and mapped to a plurality of subcarriers in the frequency domain. In an exemplary embodiment of the communication system, the at least one sequence constituting the first radio signal may correspond to at least one binary sequence or complex sequence.

Effects of Doppler Shift and Carrier Frequency Offset on Uplink

Before describing proposed methods in the present disclosure, the effects of Doppler shift (DS) and carrier frequency offset (CFO) on uplink (UL) will be described. In the following description, notations shown in Table 4 will be used. Additionally, the notations shown in Table 4 may also be used in the proposed methods of the present disclosure.

TABLE 4

| Notation | Description |
|---|---|
| $f_{c, BS}$ | Carrier frequency of base station |
| $f_{c, MS}$ | Carrier frequency of terminal |
| $\Delta f$ | Carrier frequency offset, a difference between the carrier frequency of base station and the carrier frequency of terminal $\Delta f = f_{c, BS} - f_{c, MS}$ |
| $f_d$ | Doppler shift |

Figure 4:
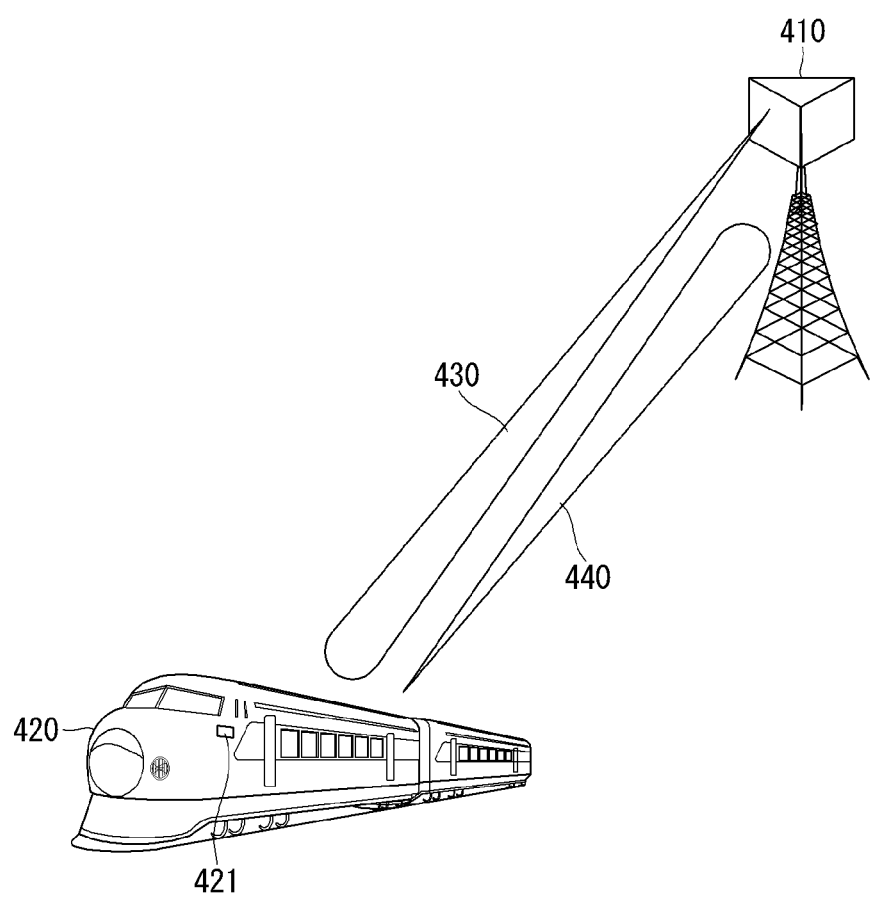
FIG. 4 is a conceptual diagram illustrating the effects of uplink Doppler shift and carrier frequency offset in a communication system according to an exemplary embodiment of the present disclosure.

Communication Environment Considering the Effects of Uplink Doppler Shift and Carrier Frequency Offset FIG. 4 is a conceptual diagram illustrating the effects of uplink Doppler shift and carrier frequency offset in a communication system according to an exemplary embodiment of the present disclosure.

Referring to FIG. 4, a communication system may include a base station 410, a high-speed vehicle 420, and a terminal 421 within the high-speed vehicle. The base station 410 may transmit a synchronization signal (SS), reference signal (RS), data channel, and control channel to the high-speed vehicle 420 and the terminal 421 within the high-speed vehicle by using a downlink 430. Each of the high-speed vehicle 420 and the terminal 421 within the high-speed vehicle may transmit a preamble, reference signal, data channel, and control channel to the base station 410 by using an uplink 440. The terminal 421 within the high-speed vehicle may be a user terminal riding on the high-speed vehicle or an object within the high-speed vehicle.

As shown in Table 5, the signals transmitted in the DL 430 may include at least one of a synchronization signal, DL data channel, DL control channel, and reference signal.

TABLE 5

| Type | | Description |
|---|---|---|
| Synchronization signal | | The synchronization signal (SS) may be classified into a primary synchronization signal (PSS) and a secondary synchronization signal (SSS). The SS may be periodically transmitted together with a physical broadcast channel (PBCH) as being included in a synchronization signal block (SSB). |
| DL data channel | PDSCH | The DL data channel corresponds to a physical downlink shared channel (PDSCH), and is used to transmit user data. |
| DL control channel | PDCCH | The DL control channel corresponds to a physical downlink control channel (PDCCH), and is used to transmit control information. |
| DL reference signal | CSI-RS | The channel state information (CSI)-reference signal (RS) is transmitted to estimate DL radio channel characteristics. The CSI-RS may be transmitted to one terminal, or shared by a plurality of terminals. |
| | DM-RS | The demodulation reference signal (DM-RS) is used for estimation and demodulation of a DL physical channel. The DL DM-RS may be included in each of a PDCCH and a PDSCH. |
| | PT-RS | The phase tracking reference signal (PT-RS) is used to remove phase noises in a millimeter wave (mmWave) band. The DL PT-RS may be included in a PDSCH. |
| | PRS | The positioning reference signal (PRS) is used to estimate geographic position information of the terminal. |

Table 5 is an example showing an exemplary embodiment of DL configuration in the communication system.

In Table 5, the synchronization signal may be classified into a PSS and SSS. The PSS may be used to acquire radio frame synchronization, and the SSS may be used to acquire frame synchronization, and may be used to obtain a cell group ID, and/or cyclic prefix (CP) configuration of a cell. Each of a PBCH, PDCCH, and PDSCH may include corresponding (mapped) DM-RS. The PT-RS may be included only in a PDSCH. On the other hand, a CSI-RS and PRS are provided to the terminal, and may not be included in each of the PBCH, PDCCH, and PDSCH.

TABLE 6

| Type | | Description |
|---|---|---|
| Preamble | | The preamble is used to acquire synchronization between the terminal and the base station. The preamble may be transmitted on a physical random access channel (PRACH). |
| UL data channel | PUSCH | The UL data channel corresponds to a physical uplink share channel (PUSCH), and is used to transmit user data. |
| UL control channel | PUCCH | The UL control channel corresponds to a physical uplink control channel (PUCCH), and is used to transmit control information. |

TABLE 6-continued

| Type | | Description |
| --- | --- | --- |
| UL reference signal | DM-RS | The demodulation reference signal (DM-RS) is used for channel estimation and demodulation of a related physical channel. The DM-RS may be included in each of a PUCCH and a PUSCH. |
| | PT-RS | The PT-RS is used to remove phase noises in a millimeter wave (mmWave) band. The UL PT-RS may be included in a PUSCH. |
| | SRS | The sounding reference signal (SRS) is transmitted to estimated UL radio channel characteristics. |

Table 6 is an example showing an exemplary embodiment of UL configuration in the communication system.

In Table 6, the terminal may attempt a random access (RA) procedure to access the base station. In the RA procedure, a preamble may be transmitted to the base station on a PRACH. The UL DM-RS may be used as an RS for channel estimation and channel modulation for a PUCCH and PUSCH, respectively. The UL PT-RS may be included in a PUSCH as an RS to remove phase noises on the PUSCH in a millimeter wave (mmWave) band. The UL SRS may correspond to the DL CSI-RS and may be used to estimate a UL channel.

Effects of Doppler Shift on Uplink

Even in an environment where there is no carrier frequency offset in the communication system, a high Doppler shift may occur because a terminal (e.g. high-speed vehicle 420, high-speed vehicle boarding terminal 421) moves at a high speed (or time-varying characteristic information corresponding to the high speed). Since a Doppler shift has twice the effect on the uplink 440 as on the downlink 430, a problem may occur that degrades data restoration performance. In the following description, 'speed' may mean 'speed information'. Additionally, the speed information may mean time-varying characteristic information and/or time-varying characteristic information corresponding to the speed. Therefore, hereinafter, the speed or speed information in the description and claims should be understood to include time-varying characteristic information and/or time-varying characteristic information corresponding to the speed.

When the terminal 420 or 421 perform frequency synchronization for the downlink 430, it may be assumed that there is no carrier frequency offset $\Delta f$ between the base station 410 and the terminal 420 or 421 (i.e. $\Delta f=0$). Instead, a Doppler shift $f_d$ may be estimated, and the estimated Doppler shift $f_d$ may be considered as the carrier frequency offset $\Delta f$. When the terminal 420 or 421 performs transmission to the base station 410 in the uplink 440, a carrier frequency $f_1$ may be represented as a sum of a carrier frequency $f_{c,MS}$ of the terminal and the Doppler shift $f_d$ as shown in Equation 1 (i.e. $f_1=f_{c,MS}+f_d$). For convenience of description, it is assumed that there may be no carrier frequency offset between the base station 410 and the terminal 420 or 421, but the present disclosure is not limited thereto. In other words, it may be assumed that a carrier frequency offset exists between the base station 410 and the terminal 420 or 421 (i.e. ($\Delta f \neq 0$).

$$f_1 = f_{c,MS} \Delta f + f_d = f_{c,MS} + f_d,$$

$$\Delta f = f_{c,BS} - f_{c,MS} = 0 \quad \text{[Equation 1]}$$

An uplink signal transmitted from the terminal 420 or 421 is defined as a transmission signal $s_{b,MS,UL}(t)$ in a baseband, and may be expressed as Equation 2. Here, t represents an uplink transmission time.

$$s_{b,MS,UL}(t) = s_{UL}(t) e^{j2\pi f_d t} \quad \text{[Equation 2]}$$

Here, $s_{UL}$ (t) represents an uplink signal to be transmitted in the baseband.

Meanwhile, when the terminal 420 or 421 moves, a Doppler shift may occur in the uplink signal of the terminal 420 or 421. For the uplink signal of the terminal 420 or 421, a carrier frequency difference $f_{cfo,UL}$ between the base station 410 and the terminal 420 or 421 may be expressed as Equation 3.

$$f_{cfo,UL} = f_1 + f_d - f_{c,BS} = 2f_d - f_{c,MS} - f_{d,BS} = 2f_d - \Delta f = 2f_d,$$

$$\Delta f_{c,BS} - f_{c,MS} = 0 \quad \text{[Equation 3]}$$

An uplink signal received at the base station 410 from the terminal 420 or 421 is defined as a reception signal $s_{b,BS,UL}(t)$ in the baseband, and may be expressed as Equation 4.

$$s_{b,MS,UL}(t) = s_{UL}(t) e^{j2\pi (2f_d) t} \quad \text{[Equation 4]}$$

Referring to Equation 1 to Equation 4, even if a CFO does not exist between the base station 410 and the terminal 420 or 421 (i.e. ($\Delta f=0$), the base station 410 may experience twice the Doppler shift effect on the uplink from the terminal 420 or 421.

The terminal 420 or 421 may prevent the doubled effect of DS on the uplink by performing frequency pre-shift in the uplink 440. However, there may be a CFO between the base station 410 and the terminal 420 or 21 (i.e. $\Delta f \neq 0$). When base station 410 receives the uplink signal in the uplink 440, the doubled CFO may affect the base station 410 as follows.

Effects of Carrier Frequency Offset on Uplink Transmission

To prevent the effects of the doubled DS on the uplink 440, the terminal 420 or 421 may perform frequency pre-shift on a transmission in the uplink 440, and transmit it to the base station 410. It may be assumed that the terminal 420 or 421 cannot distinguish and estimate CFO $\Delta f$ and DS $f_d$ for a transmission in the downlink 430. Additionally, it may be assumed that there is a CFO between the base station 410 and the terminal 420 or 421 (i.e. $\Delta f \neq 0$).

For the transmission in the downlink 430 of the base station 410, a carrier frequency difference $f_{cfo,DL}$ between the base station 410 and the terminal 420 or 421 may be expressed as Equation 5.

$$f_{cfo,DL} = f_d f_{c,BS} - f_{c,MS} = \Delta f + f_d \quad \text{[Equation 5]}$$

Assuming that the terminal 420 or 421 cannot distinguish and estimate CFO $\Delta f$ and DS $f_d$ for the downlink transmission 430, the terminal 420 or 421 may estimate a frequency shift for the downlink transmission as shown in Equation 5.

The terminal 420 or 421 may perform compensation by performing frequency pre-shift by twice the estimated frequency shift ($\Delta f + f_d$) (i.e. pre-shift by $-2(\Delta f + f_d)$). The compensated carrier frequency $f_1$ in the terminal 420 or 421 may be used to perform uplink transmission to the base station 410 in the uplink 430. The carrier frequency $f_1$ may be expressed as Equation 6. Compensating by performing frequency pre-shift based on the estimated frequency shift as described above may be referred to as 'frequency pre-shift (FPS)'.

$$f_1 = f_{c,MS} + \Delta f + \Delta f_d - 2(\Delta f + f_d) = f_{c,MS} - \Delta f - f_d,$$

$$\Delta f = f_{c,MS} - f_{c,MS} \neq 0.$$ [Equation 6]

The compensated uplink transmission in the terminal 420 or 421 may be expressed as Equation 7 as a transmission signal $s_{b,MS,UL}(t)$ in the baseband.

$$s_{b,MS,UL}(t) = s_{UL}(t) e^{j2\pi(-\Delta f - f_d)t}$$ [Equation 7]

Here, $s_{UL}(t)$ represents an uplink transmission signal to be transmitted in the baseband. Meanwhile, when the terminal 420 or 421 moves, a DS $f_d$ may occur with respect to an uplink transmission of the terminal 420 or 421. The base station 410 may receive an uplink transmission, to which frequency pre-shift by twice the estimated frequency shift $\Delta f + f_d$ is applied, from the terminal 420 or 421. For the uplink transmission of the terminal 420 or 421 received at the base station 410, a carrier frequency difference $f_{cfo,UL}$ between the base station 410 and the terminal 420 or 421 may be expressed as Equation 8.

$$f_{cfo,UL} = f_1 + f_d - f_{c,BS} = f_{c,MS} - \Delta f - f_{c,BS} = -2\Delta f,$$

$$\Delta f = f_{c,BS} - f_{c,MS} \neq 0.$$ [Equation 8]

In addition, the compensated uplink transmission received from the terminal 420 or 421 at the base station 410 may be expressed as Equation 9 as a reception signal $s_{b,BS,UL}(t)$ in the baseband. Here, the compensated uplink transmission may mean uplink transmission that is frequency pre-shifted by twice the estimated frequency shift ($\Delta f + f_d$).

$$s_{b,BS,UL}(t) = s_{UL}(t) e^{j2\pi(-\Delta f - f_d)t} e^{j2\pi f_d t} e^{j2\pi(-\Delta f)t} = s_{UL}(t) e^{j2\pi(-2\Delta f)t}$$ [Equation 9]

Referring to Equation 9, when the frequency pre-shift method is used for uplink transmission, the effects of the Doppler shift between the base station 410 and the terminal 420 or 421 can be eliminated. However, when the base station 410 receives uplink transmission from the terminal 420 or 421, twice the CFO may have effects. On the other, if a CFO does not exist between the base station 410 and the terminal 420 or 421 (i.e. $\Delta f = 0$), the base station 410 may not be affected by the Doppler shift.

As described above, assuming that a CFO does not exist, a two-fold Doppler shift may affect uplink transmission when the frequency pre-shift method is not used. On the other hand, when the frequency pre-shift method is used, the Doppler shift effects can be removed from the uplink transmission. However, in reality, the CFO may have a greater impact on the demodulation performance of uplink transmission than the Doppler shift.

Meanwhile, in the present disclosure, a transmission and reception method and procedure will be proposed that can eliminate the negative impacts of CFO and DS on uplink transmission and reception performance even in an environment where CFO and DS exist together. The transmission and reception method and procedure proposed in the present disclosure can also be applied to a multi-path environment.

In the present disclosure, according to the proposed method, it may be assumed that the terminal cannot distinguish and estimate CFO and DS in downlink transmission. Therefore, the terminal may estimate a sum of CFO and DS without separately estimating CFO and DS for downlink transmission. The estimation of a sum of CFO and DS without separately estimating CFO and DS may be referred to as 'frequency offset (FO) estimation'. In addition, even when CFO and DS are estimated separately, the estimation of a sum of CFO and DS with separately estimating CFO and DS may also be referred to as 'frequency offset (FO) estimation'.

Proposal 1: Frequency Pre-Shift and CFO Feedback Based DS Compensation Method and Procedure In the first proposal ('frequency pre-shift and CFO feedback based DS compensation method and procedure'), the terminal may estimate a FO between the base station and the terminal based on a downlink transmission received from the base station, and the terminal may transmit an uplink transmission frequency pre-shifted based on the estimated FO to the base station. The base station may estimate a CFO between the base station and the terminal based on the frequency pre-shifted uplink transmission, and may transmit a downlink transmission for which the estimated CFO is compensated to the terminal. The estimated CFO may be provided to the terminal as CFO feedback information by being included in a downlink transmission. Here, it is assumed that the terminal cannot distinguish and estimate CFO and DS for downlink transmission. The FO estimation may mean estimation of a sum of CFO and DS. The frequency pre-shift may mean frequency pre-compensation based on frequency pre-shift.

Figure 5:
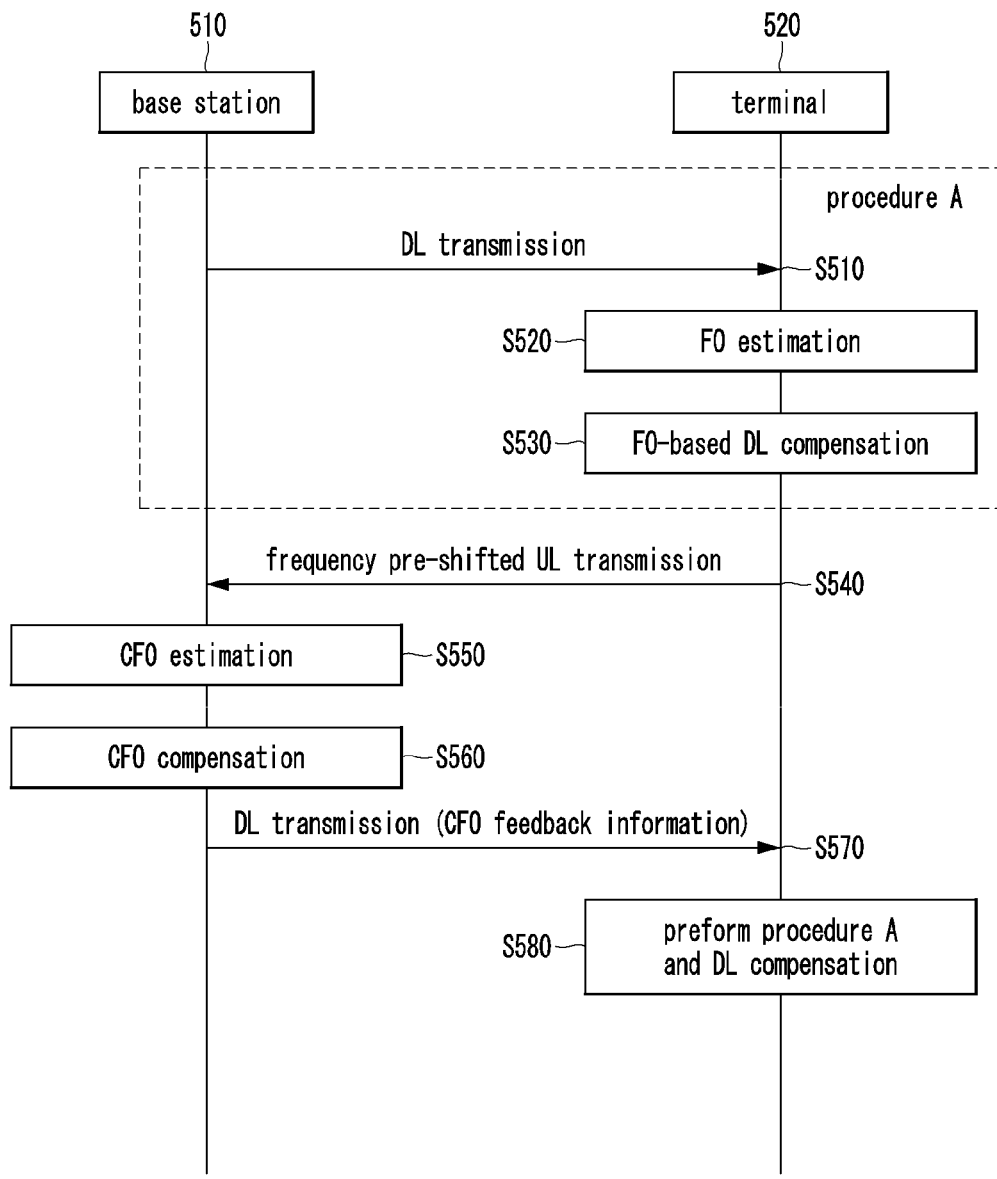
FIG. 5 is a sequence chart illustrating a Doppler shift compensation method and procedure based on frequency pre-shift and carrier frequency offset feedback according to an exemplary embodiment of the present disclosure.

FIG. 5 is a sequence chart illustrating a Doppler shift compensation method and procedure based on frequency pre-shift and carrier frequency offset feedback according to an exemplary embodiment of the present disclosure.

Referring to FIG. 5, a communication system may include a base station 510, a terminal 520, and the like. The base station 510 may be the base station 110-1, 110-2, 110-3, 120-1, or 120-2 shown in FIG. 1, and the terminal 520 may be the terminal 130-1, 130-2, 130-3, 130-4, 130-5, or 130-6 shown in FIG. 1. The base station 510 may perform downlink transmission to the terminal 520, and the terminal 520 may estimate a FO between the base station 510 and the terminal 520 based on a received downlink transmission. The downlink transmission may refer to transmission of downlink control information, downlink data, downlink channel, and/or downlink signal (e.g. synchronization signal (SS) and/or reference signal (RS)). The terminal 520 may perform compensation for downlink transmission based on the estimated FO, and the terminal 520 may perform frequency pre-shift by twice the estimated FO, and may perform uplink transmission to the base station 510 by using the pre-shifted frequency. The uplink transmission may refer to transmission of uplink control information, uplink data, uplink channel, and/or uplink signal (e.g. preamble and/or reference signal). The base station 510 may estimate a CFO between the base station 510 and the terminal 520 based on an uplink transmission received from the terminal 520, and may perform compensation for downlink transmission for the terminal 520 based on the estimated CFO. The compensated downlink transmission for the terminal 520 may include CFO feedback information including the estimated CFO information. The terminal 520 may receive the downlink transmission compensated for which the estimated CFO is compensated from the base station 510. The CFO feedback information included in the compensated downlink transmission may provide information the CFO estimated by the base station 510 to the terminal 520. In FIG. 5, steps S510 to S530 may be referred to as 'procedure A'. It may be assumed that the terminal 520 cannot separately estimate CFO and DS for downlink transmission. For convenience of description, only one terminal 520 is shown in FIG. 5, but a plurality of terminals may exist.

In a step S510, the base station 510 may transmit a downlink transmission to the terminal 520, and the terminal 520 may receive the downlink transmission from the base station 510. Here, the downlink transmission may include a synchronization signal and/or reference signal for estimating a CFO and DS between the base station 510 and the terminal 520.

For example, the synchronization signal may include a PSS and SSS as shown in Table 7, and may be periodically transmitted together with a PBCH as being included in a synchronization signal block (SSB). In addition, the RS may include at least one of the CSI-RS, DM-RS, PT-RS, or PRS, as shown in Table 7.

In steps S520 and S530, the terminal 520 may estimate a FO $f_{cfod}$ between the base station 510 and the terminal 520 based on the downlink transmission received from the base station 510 (S520). The terminal 520 may perform compensation for downlink transmission based on the estimated FO $f_{cfod}$ (S530). Here, the compensation for downlink transmission may mean compensation for the synchronization signal and/or RS included in the downlink transmission to estimate the CFO $\Delta_f$ and DS $f_d$ between the base station 510 and the terminal 520.

The terminal 520 may perform estimation of a FO $f_{cfod}$ for downlink transmission based on a predefined method in the step S520. The terminal 520 may compensate for the estimated FO $f_{cfod}$ using software or hardware in the step S530. In addition, the estimated FO may also be compensated through a combination of software and hardware in the step S530.

In the step S540, the terminal 520 may perform frequency pre-shift by twice the FO $f_{cfod}$ estimated in the step S520, and perform uplink transmission to the base station 510 using the pre-shifted frequency. The base station 510 may receive the frequency pre-shifted uplink transmission from the terminal 520. Here, the uplink transmission may include a preamble and/or reference signal. The frequency pre-shift may mean frequency pre-compensation, as mentioned above.

For example, if a radio resource control (RRC) connection between the terminal 520 and the base station 510 is in an RRC inactive state or RRC idle state, the terminal 520 may attempt to access the base station 510 according to an RA procedure. The terminal 520 may transmit an uplink transmission including a preamble to the base station 510. When a 2-step RA procedure is used, the uplink transmission may include a data channel (e.g. PUSCH). On the other hand, when the RRC connection between the terminal 520 and the base station 510 is in an RRC connected state, the terminal 520 may transmit an uplink transmission including at least one of a DM-RS, PT-RS, or SRS as shown in Table 7 to the base station 510. Additionally, the uplink transmission may include at least one of a data channel or a control channel (e.g. PUCCH) as needed.

Meanwhile, the frequency pre-shifted uplink transmission from a terminal m may be expressed as a baseband signal $s_{b,m,UL}(n)$ in the time domain, as shown in Equation 10. Here, m may be defined as $1 \leq m \leq K$, and K is the number of terminals connected to the base station.

$$s_{b,m,UL}(n) = s_{m,UL}(n)e^{j\frac{2\pi(-2f_{cfod,m})n}{N}},$$
$$n = 0, 1, 2, \ldots, N-1$$

[Equation 10]

Here, $s_{m,UL}(n)$ may be a signal to be transmitted through the uplink transmission from the terminal m, and $f_{cfod,m}$ may be a FO $f_{cfod}$ estimated for downlink transmission at the terminal m. n may be a sample index, and N may be the size of the Inverse Fast Fourier Transform (IFFT) (corresponding to one valid OFDM symbol).

In Equation 10, the frequency pre-shifted uplink transmission from the terminal m may be advanced by twice the estimated FO $f_{cfod}$ (i.e. $-2f_{cfod}$).

Meanwhile, in Equation 10, a CP may be excluded for one OFDM symbol. This is merely for convenience of description and the present disclosure is not limited thereto. The CP for one OFDM symbol may be excluded from Equation described later.

In a step S550, the base station 510 may perform estimation of a CFO Of between the base station 510 and the terminal 520 based on the frequency pre-shifted uplink transmission received in the step S540. A predefined method may be used to estimate CFO $\Delta f$ between the base station 510 and the terminal 520.

In a step S560, the base station 510 may determine whether a CFO compensation condition is satisfied based on the CFO $\Delta f$ estimated in the step S550. When it is determined that the CFO compensation condition is satisfied, the base station 510 may generate CFO feedback information including the estimated CFO information, and generate a downlink transmission including the CFO feedback information. The base station 510 may compensate for the downlink transmission for the terminal 520 based on the estimated CFO information, and perform the compensated downlink transmission to the terminal 520 (S570). Here, the estimated CFO information may include the estimated CFO $\Delta f$.

On the other hand, in the step S560, when it is determined that the CFO compensation condition is not satisfied, the base station 510 may generate information indicating to ignore the estimated CFO $\Delta f$ or CFO feedback information including the estimated CFO information, and include it in a downlink transmission for the terminal 520. The base station 510 may transmit the downlink transmission to the terminal 520 without performing compensation on the downlink transmission to the terminal 520 based on the estimated CFO $\Delta f$ (S570).

Meanwhile, in the step S560, the terminal 520 may receive the downlink transmission including the CFO feedback information from the base station 510. The CFO feedback information may be transmitted to the terminal 520 based on at least one of RRC signaling, MAC CE signaling, or PHY signaling.

In a step S580, the terminal 520 may perform the procedure A to compensate for the downlink transmission. The terminal 520 may restore the CFO feedback information included in the data channel of the downlink transmission. Additionally, the terminal 520 may obtain the CFO feedback information. Here, the downlink transmission that can be compensated by performing the procedure A may include a synchronization signal and/or RS to estimate CFO and DS between the base station 510 and the terminal 520, as mentioned above. The restoration may mean decoding.

In the step S580, if the obtained CFO feedback information includes the estimated CFO information, the terminal 520 may consider the CFO estimated at the base station 510 when estimating the downlink FO $f_{cfod}$ in the step S520. On the other hand, if the obtained CFO feedback information includes information indicating to ignore the estimated CFO, the terminal 520 may not consider the CFO estimated at the base station 510 when estimating the downlink FO $f_{cfod}$ in the step S520. Here, the estimated CFO information may be estimated CFO information included in CFO feedback information previously received before the CFO feedback information including the information indicating to ignore the estimated CFO is received.

When the step S580 is completed, the steps S540 to S580 may be performed repeatedly.

Here, the CFO compensation condition at base station 510 will be described.

In an exemplary embodiment, the CFO compensation condition at the base station 510 may be a condition for determining whether the estimated CFO Δf is greater than or equal to a CFO threshold $T_{\Delta f}$ (i.e. $\Delta f \geq T_{\Delta f}$). It may be assumed that the CFO Δf estimated at the base station 510 is greater than or equal to the CFO threshold $T_{\Delta f}$. Here, the CFO threshold $T_{\Delta f}$ may be a predetermined value.

In an exemplary embodiment, the base station 510 may estimate the CFO Δf between the base station 510 and the terminal 520 based on the frequency pre-shifted uplink transmission received from the terminal 520. The base station 510 may determine that the CFO compensation condition (i.e. $\Delta f \geq T_{\Delta f}$) is satisfied for the uplink transmission of the terminal 520. The base station 510 may include CFO feedback information including the estimated CFO information in a downlink transmission for the terminal 520. Here, the estimated CFO information may include the estimated CFO Δf.

In an exemplary embodiment, the base station 510 may compensate for the estimated CFO Δf for the downlink transmission for the terminal 520 based on the estimated CFO, and perform the downlink transmit to the terminal 520. The terminal 520 may receive the downlink transmission from the base station 510 and obtain the CFO feedback information including the estimated CFO information. The terminal 520 may consider the estimated CFO information when performing estimation and/or compensation for the downlink transmission (e.g. steps S520 and/or S530 in the procedure A in FIG. 5).

In another exemplary embodiment, the CFO compensation condition at the base station 510 may be a condition for determining whether the estimated CFO Δf is greater than or equal to the CFO threshold $T_{\Delta f}$ (i.e. $\Delta f \geq T_{\Delta f}$). It may be assumed that the CFO Δf estimated at the base station 510 is less than the CFO threshold $T_{\Delta f}$ (i.e. $\Delta f \geq T_{\Delta f}$). Here, the CFO threshold $T_{\Delta f}$ may be a predetermined value.

In another exemplary embodiment, the base station 510 may estimate the CFO Δf between the base station 510 and the terminal 520 based on the frequency pre-shifted uplink transmission received from the terminal 520. The base station 510 may determine that the CFO compensation condition (i.e. $\Delta f \geq T_{\Delta f}$) is not satisfied for the uplink transmission of the terminal 520. The base station 510 may include CFO feedback information including information indicating to ignore the estimated CFO in a downlink transmission for the terminal 520.

In another exemplary embodiment, the base station 510 may transmit the downlink transmission for the terminal 520 to the terminal 520 without compensation for the estimated CFO Δf. The terminal 520 may receive the downlink transmission from the base station 510, and obtain the CFO feedback information including the information indicating to ignore the estimated CFO. The terminal 520 may determine that the base station 510 estimated the CFO Δf between the base station 510 and the terminal 520, and did not compensate for it. The terminal 520 may not consider the estimated CFO information when performing estimation and/or compensation for the downlink transmission (e.g., step S520 and/or step S530 in the procedure A in FIG. 5). Here, the estimated CFO information may be estimated CFO information included in CFO feedback information previously received before the CFO feedback information including the information indicating to ignore the estimated CFO is received.

As another exemplary embodiment, the base station 510 may estimate the CFO Δf between the base station 510 and the terminal 520 based on the frequency pre-shifted uplink transmission received from the terminal 520. The base station 510 may determine that the CFO compensation condition (i.e. $\Delta f \geq T_{\Delta f}$) is not satisfied for the uplink transmission of the terminal 520 (i.e. $\Delta f \geq T_{\Delta f}$). The base station 510 may include CFO feedback information including the estimated CFO information in a downlink transmission for the terminal 520. Here, the estimated CFO information may include the estimated CFO Δf.

In another exemplary embodiment, the base station 510 may transmit the downlink transmission for the terminal 520 to the terminal 520 without compensation for the estimated CFO Δf. The terminal 520 may receive the downlink transmission from the base station 510 and obtain the CFO feedback information including the estimated CFO information. The terminal 520 may consider the estimated CFO information when performing estimation and/or compensation for the downlink transmission (e.g. step S520 and/or step S530 in the procedure A in FIG. 5).

In the above-described exemplary embodiments, the CFO feedback information may be expressed as Table 7.

TABLE 7

| | |
|---|---|
| CfoFeedbackInfo ::= | SEQUENCE { |
|   cfoIgnoreCompensationInd | ENUMERATED { true }, |
|   cfoEstimatedInfo | , |
|   ... | |
| } | |
| CfoEstimatedInfo ::= | SEQUENCE { |
|   cfoEstimatedValue | INTEGER (minCfoEstimatedValue..maxCfoEstimatedValue), |
|   ... | |
| } | |
| minCfoEstimatedValue | INTEGER ::= −1024 |
| maxCfoEstimatedValue | INTEGER ::= 1024 |

Table 7 is an example showing an exemplary embodiment of CFO feedback information.

Referring to Table 7, CFO feedback information CfoFeedbackInfo may include at least one of an indicator cfoIgnoreCompensationInd indicating to ignore the estimated CFO or estimated CFO information cfoEstimatedInfo. Here, the estimated CFO information cfoEstimatedInfo may include an estimated CFO value cfoEstimatedValue, or the like. The estimated CFO value cfoEstimatedValue may be a value between the minimum integer value minCfoEstimatedValue and the maximum integer value maxCfoEstimatedValue.

Table 7 is merely an example of the CFO feedback information and is not intended to limit the CFO feedback information. That is, the CFO feedback information is not limited to Table 7.

In the above-described exemplary embodiments, the information indicating to ignore the estimated CFO may correspond to the indicator cfoIgnoreCompensationInd indicating to ignore the estimated CFO. The estimated CFO Δf may correspond to the estimated CFO value cfoEstimatedValue included in the estimated CFO information.

The terminal may compensate for the FO estimated for uplink transmission as shown in Equation 10 in the time domain. Additionally, the terminal may compensate for the estimated FO for uplink transmission in the frequency domain as follows.

Figure 6:
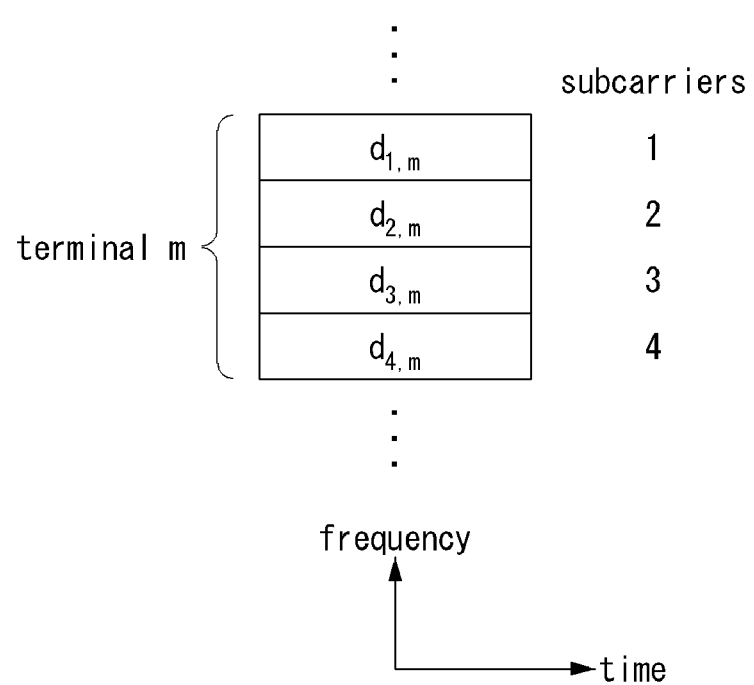
FIG. 6 is a conceptual diagram illustrating a frequency pre-shift based frequency offset compensation method and procedure in the frequency domain according to an exemplary embodiment of the present disclosure.

FIG. 6 is a conceptual diagram illustrating a frequency pre-shift based frequency offset compensation method and procedure in the frequency domain according to an exemplary embodiment of the present disclosure.

Referring to FIG. 6, an uplink transmission from the terminal m ($1 \leq m \leq K$, where K is the number of terminals connected to the base station) may be allocated a plurality of subcarrier resources (i.e. subcarriers 1 to 4) in the frequency domain. A vector $d_m$ may represent the uplink transmission from the terminal m transmitted in the plurality of allocated subcarrier resources (i.e. subcarriers 1 to 4). Here, it is assumed that terminal m is connected to the base station. For convenience of description, four subcarrier resources (e.g. subcarriers 1 to 4) are shown in FIG. 5, but the present disclosure is not limited thereto.

The compensation in the frequency domain may be expressed as a compensation matrix $E_m$, and the compensation matrix $E_m$ may mean a matrix that performs compensation based on frequency pre-shift by twice the FO $f_{cfod,m}$ estimated by the terminal m. The uplink transmission from the terminal m may be compensated by performing frequency pre-shift in the frequency domain. The compensated uplink transmission from the terminal m may be expressed as a vector $\tilde{d}_m$.

The uplink transmission from the terminal m may be expressed as a vector $d_m$ in the frequency domain as shown in Equation 11, and the compensation matrix $E_m$ may be expressed as Equation 12. Further, for the terminal m, the uplink transmission obtained by compensating for the FO $f_{cfod,m}$ estimated in the frequency domain may be expressed as a vector $d_m$m, as shown in Equation 13.

$$d_m = \begin{bmatrix} d_{1,m} \\ d_{2,m} \\ d_{3,m} \\ d_{3,m} \end{bmatrix} \quad \text{[Equation 11]}$$

Here, $d_{i,m}$ (i=1, ..., 4) represents the uplink transmission from the terminal m, which is transmitted the allocated subcarrier resource i.

$$E_m = \begin{bmatrix} E_{11,m} & E_{12,m} & E_{13,m} & E_{14,m} \\ E_{21,m} & E_{22,m} & E_{23,m} & E_{24,m} \\ E_{31,m} & E_{32,m} & E_{33,m} & E_{34,m} \\ E_{41,m} & E_{42,m} & E_{43,m} & E_{44,m} \end{bmatrix} \quad \text{[Equation 12]}$$

Here, $E_{il}$ (i,l=1, 2, 3, 4) is an element of the compensation matrix $E_m$. The compensation matrix $E_m$ is a matrix that performs frequency pre-compensation by performing frequency pre-shift by twice the estimated FO $f_{cfod,m}$ of the terminal m in the frequency domain.

$$\tilde{d}_m = E_m d_m \quad \text{[Equation 13]}$$

Referring to Equation 13, the data vector $\tilde{d}_m$ may represent the uplink transmission obtained by compensating for the FO $f_{cfod,m}$ estimated at the terminal m in the frequency domain. If the vector $\tilde{d}_m$ is transmitted in an arbitrary frequency resource that is distinct for each terminal, the vector $\tilde{d}_m$ may not affect other frequency resources. Equivalently, in the frequency domain, the frequency pre-shifted uplink transmission of the terminal m may be compensated by the estimated $f_{cfod,m}$ Proposal 2: Speed (or Speed-Equivalent Time-Varying Characteristic Information) Estimation Feedback-Based DS Compensation Method and Procedure The second proposal ('speed (or time-varying characteristic information corresponding to the speed) estimation feedback based DS compensation method and procedure') can prevent the effects of Doppler shift and carrier frequency offset on uplink transmission based on speed feedback information (or time-varying characteristic information corresponding to the speed) at the terminal and Doppler shift feedback information at the base station. Here, it is assumed that the terminal cannot separately estimate CFO and DS for downlink transmission. As previously mentioned, estimation of a sum of CFO and DS may be referred to as 'FO estimation'.

Figure 7:
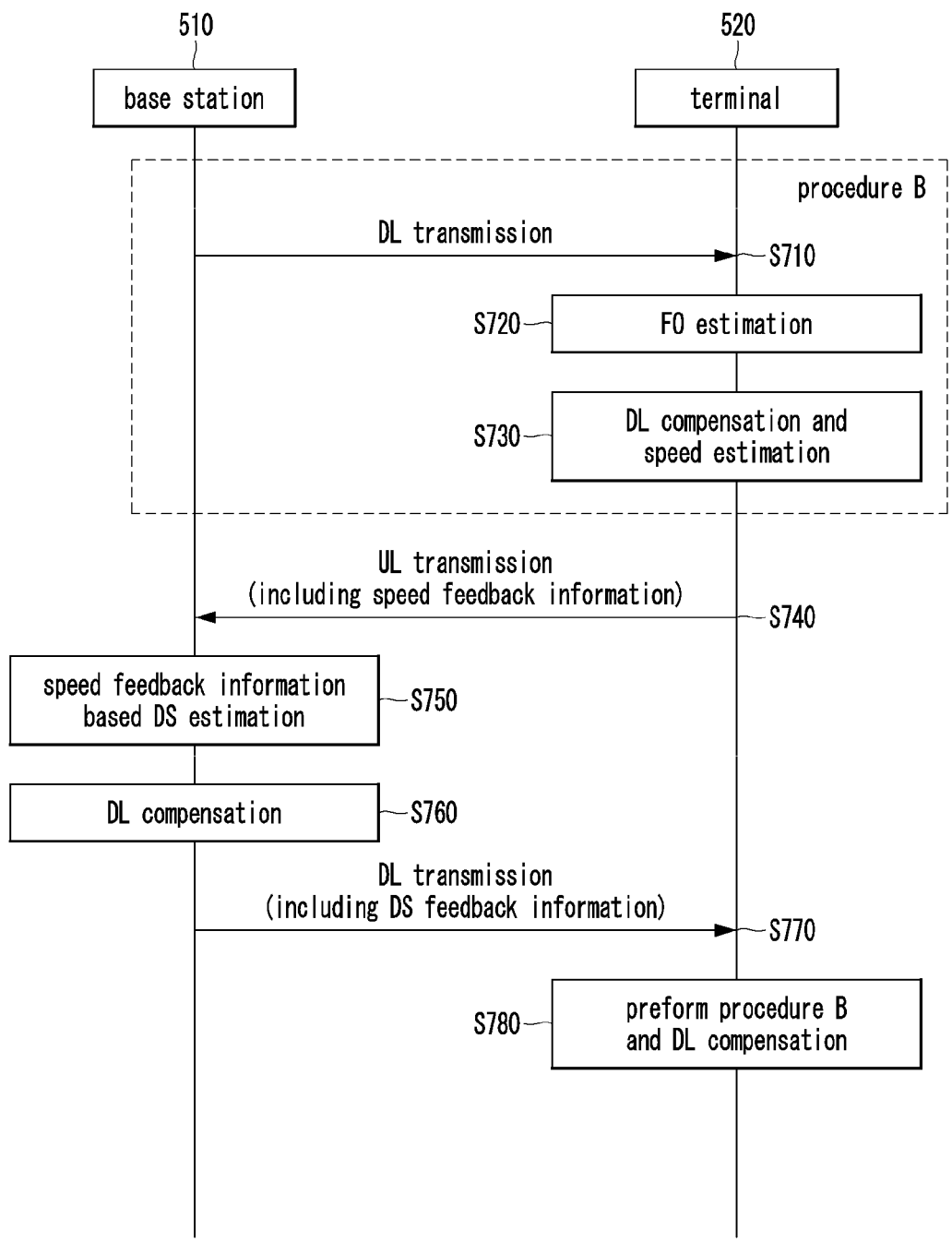
FIG. 7 is a sequence chart illustrating a frequency offset compensation method and procedure based on speed (or time-varying characteristic information corresponding to speed) estimation feedback according to an exemplary embodiment of the present disclosure.

FIG. 7 is a sequence chart illustrating a frequency offset compensation method and procedure based on speed (or time-varying characteristic information corresponding to speed) estimation feedback according to an exemplary embodiment of the present disclosure.

Referring to FIG. 7, the communication system may include the base station 510, terminal 520, and the like. The base station 510 may perform downlink transmission to the terminal 520, and the terminal 520 may estimate a FO between the base station 510 and the terminal 520 based on the received downlink transmission. The terminal 520 may compensate for downlink transmission based on the estimated FO, and estimate the terminal's speed (or time-varying characteristic information corresponding to the speed). Based on the estimated speed (or time-varying characteristic information corresponding to speed), the terminal may transmit feedback information on the speed (or time-varying characteristic information corresponding to the speed) including whether a speed feedback condition is satisfied to the base station 510 by including it in an uplink transmission. The base station 510 may determine whether the terminal 520 satisfies the speed feedback condition based on the received speed feedback information (or time-varying characteristic information corresponding to the speed). When it is determined that the speed feedback condition is satisfied at the terminal 520, the base station 510 may estimate a DS between the base station 510 and the terminal 520, and transmit a downlink transmission for which the estimated DS is compensated to the terminal 420. On the other hand, when it is determined that the terminal 520 does not satisfy the speed feedback condition, the base station 510 may perform downlink transmission to the terminal 520 without estimating and compensating for the DS between the base station 510 and the terminal 520. Here, the downlink transmission transmitted with the estimated DS compensated may include DS feedback information including the estimated DS information, and the downlink transmission transmitted without compensation may include information indicating to ignore the estimated DS information. In FIG. 7, steps S710 to S730 may be referred to as a procedure B. For convenience of description, one terminal 520 is shown in FIG. 7, but a plurality of terminals may exist.

In a step S710, the base station 510 may perform downlink transmission to the terminal 520, and the terminal 520 may receive the downlink transmission from the base station 510. Here, the downlink transmission may include a synchronization signal and/or a reference signal to estimate CFO and DS between the base station 510 and the terminal 520.

As described before, the synchronization signal may include a PSS and SSS shown in Table 7, and may be transmitted periodically together with a PBCH as being included in an SSB. Additionally, the reference signal may include at least one of CSI-RS, DM-RS, PT-RS, or PRS shown in Table 7.

In steps S720 and S730, the terminal 520 may estimate an FO $f_{cfod}$ between the base station 510 and the terminal 520 based on the downlink link transmission received from the base station 510 (S720). The terminal 520 may perform compensation for downlink transmission and estimate a movement speed V (or time-varying characteristic information corresponding to the speed) of the terminal 520 based on the estimated FO $f_{cfod}$ (S730). Here, the compensation for downlink transmission may refer to a compensation for the synchronization signal and/or reference signal included in the downlink transmission to estimate CFO Δf and DS $f_d$ between the base station 510 and the terminal 520.

The terminal 520 may perform estimation of the FO $f_{cfod}$ for downlink transmission based on a predefined method in the step S720. The terminal 520 may compensate for the FO $f_{cfod}$ estimated in the step S530 using software or hardware. In addition, the estimated FO $f_{cfod}$ be compensated through a combination of software and hardware. Additionally, the terminal 520 may estimate the terminal's movement speed V (or time-varying characteristic information corresponding to the speed) based on a predefined method in the step S730.

Meanwhile, in the step S730, the estimation target has been described as the speed V (or time-varying characteristic information corresponding to the speed), but the present disclosure is not limited thereto. All parameters related to the speed (or time-varying characteristic information corresponding to speed) may be subject to the estimation.

In an exemplary embodiment, a time-selective property corresponding to the speed (or time-varying property information corresponding to the speed) may be quantitatively estimated.

In an exemplary embodiment, the base station 510 may transmit at least one symbol among a periodic RS (e.g. CSI-RS) symbol, a symbol including a periodic synchronization signal, and a symbol including an equivalent estimation signal to the terminal 520. The terminal 520 may periodically receive at least one symbol among the RS symbol, symbol including the synchronization signal, symbol including the equivalent estimation symbol from the base station 510. For at least one received symbol, a change in the RS symbol signal as time increases in the time domain for each time period may be expressed quantitatively. The quantitative expression of the change in the RS symbol signal may be regarded as an estimation of the time-selective characteristic. Therefore, the time-selective characteristic may be expressed quantitively as the speed (or time-varying characteristic information corresponding to the speed).

In a step S740, the terminal 520 may generate speed feedback information based on the time (or time-varying characteristic information corresponding to the speed) based on the speed (or time-varying characteristic information corresponding to the speed) (V) estimated in the step S730 and the speed feedback condition. When it is determined that the speed feedback condition is satisfied, the terminal 520 may generate the speed feedback information including information indicating that the speed feedback condition is satisfied. On the other hand, when it is determined that the speed feedback condition is not satisfied, the terminal 520 may generate the speed feedback information including information indicating that the speed feedback condition is not satisfied.

In the step S740, the terminal 520 may transmit the generated speed feedback information to the base station 510 by including it in an uplink transmission. The base station 510 may obtain the speed feedback information by receiving the uplink transmission including the speed feedback information from the terminal 520.

As described above, when the RRC connection between the terminal 520 and the base station 510 is in the RRC inactive state or RRC idle state, the terminal 520 may attempt to access the base station 510 according to an RA procedure. The terminal 520 may transmit an uplink transmission including a preamble and the speed feedback information to the base station 510. The terminal 520 may transmit the uplink transmission including the preamble to the base station 510. When a 2-step RA procedure is used, the uplink transmission may include a data channel (e.g. PUSCH). On the other hand, when the RRC connection between the terminal 520 and the base station 510 is in the RRC connected state, the terminal 520 may transmit speed feedback information (or time-varying characteristic information corresponding to the speed) to the base station 510 by including it in an uplink transmission comprising at least one of DM-RS, PT-RS, or SRS, as shown in Table 9. In addition, the uplink transmission may include at least one of a data channel or a control channel (e.g. PUCCH) as needed.

Meanwhile, in the step S740, the speed feedback information (or time-varying characteristic information corresponding to the speed) may be transmitted to the base station 510 based on at least one of RRC signaling, MAC CE signaling, or PHY signaling.

In a step S750, the base station 710 may determine whether a speed (or time-varying characteristic information corresponding to the speed) feedback condition is satisfied based on the speed feedback information obtained in the step S740. When it is determined that the speed feedback condition is satisfied, the base station 510 may perform estimation of a DS $f_d$ between the base station 510 and the terminal 520 based on the uplink transmission of the terminal 520. On the other hand, when it is determined that the speed feedback condition is not satisfied, the base station 510 may not perform estimation of a DS $f_d$ between the base station 510 and the terminal 520. Here, a predefined method may be used to estimate the DS $f_d$ between the base station 510 and the terminal 520.

When the DS $f_d$ between the base station 510 and the terminal 520 is estimated in the step S750, the base station 510 may generate DS feedback information including estimated DS information and include it in a downlink transmission for the terminal 520 (S760). The base station 510 may compensate for the downlink transmission for the terminal 520 based on the estimated DS, and transmit the compensated downlink transmission to the terminal 520 (S770). Here, the estimated DS information may include the estimated DS $f_d$. A predefined method may be used to compensate for the estimated DS $f_d$.

Meanwhile, if the DS $f_d$ between the base station 510 and the terminal 520 is not estimated in the step S750, the base station 510 may generate DS feedback information including information indicating to ignore the estimated DS $f_d$, and include the DS feedback information in a downlink transmission to the terminal 520 (S770). The base station 510 may transmit the downlink transmission to the terminal 520 without compensating for the downlink transmission (S770).

Meanwhile, in the step S760, the terminal 520 may receive the downlink transmission with compensated estimated DS $f_d$ or uncompensated downlink transmission from the base station 510. The downlink transmission may include the DS feedback information. The DS feedback information may be included in a DL data channel (e.g. PDSCH) based on at least one of RRC signaling, MAC CE signaling, or PHY signaling. Additionally, the downlink transmission may include a DL control channel (e.g. PDCCH) including downlink control information (DCI) (e.g. scheduling assignment, uplink scheduling grant).

The terminal 520 may compensate for the downlink transmission by performing the procedure B (S580). The terminal 520 may compensate and restore the DS feedback information included in the data channel of the downlink transmission. Additionally, the terminal 520 may obtain the DS feedback information. Here, the downlink transmission that can be compensated by performing the procedure B may include a synchronization signal or RS to estimate a CFO and DS between the base station 510 and the terminal 520, as mentioned above. Here, the restoration may mean decoding.

If the DS feedback information obtained in the step S780 includes the estimated DS information, the terminal 520 may consider the estimated DS information from the base station 510 when estimating a downlink FO $f_{cfod}$ in the step S720 of the procedure B. On the other hand, when the obtained DS feedback information includes information indicating to ignore the estimated DS $f_d$, the terminal 520 may not consider the estimated DS information (i.e. estimated DS $f_d$) from the base station 510 when estimating the downlink FO $f_{cfod}$ in the step S720. Here, the estimated DS information (including estimated DS $f_d$) may be estimated DS information included in DS feedback information previously received before the DS feedback information including information indicating to ignore the estimated DS is received.

Meanwhile, when the step S580 is completed, the steps S540 to S580 may be performed repeatedly.

Hereinafter, a DS compensation conditions at the terminal 520 will be described.

In an exemplary embodiment, the DS compensation condition at the terminal 520 may be a condition for determining whether the estimated speed V (or time-varying characteristic information corresponding to the speed) is greater than or equal to a speed threshold $T_V$ (i.e. $V \geq T_V V$). It may be assumed that the speed V (or time-varying characteristic information corresponding to the speed) estimated by the terminal 520 corresponds to a low mobility and is less than the speed threshold $T_V$ (i.e. $V < T_V$). If the estimated speed V is less than the speed threshold $T_V$, the length $N_4$ of a basic vector (i.e. Doppler domain (DD)/time domain (TD)) may be expressed equal to 1 (i.e. $N_4=1$). Here, the speed threshold $T_V$ may be a predetermined value or a value configured by the base station 510.

In an exemplary embodiment, the base station 510 may receive an uplink transmission including speed feedback information (or time-varying characteristic information corresponding to the speed) indicating that the speed feedback condition (i.e. $V \geq T_V$) is not satisfied. The base station 510 may determine that the speed feedback condition is not satisfied by the terminal 520 based on the speed feedback information, and may not perform estimation of a DS $f_d$ between the base station 510 and the terminal 520. The base station 510 may include DS feedback information including information indicating to ignore the estimated DS in a downlink transmission to the terminal 520.

In an exemplary embodiment, the base station 510 may not perform compensation for the DS between the base station 510 and the terminal 520 for the downlink transmission to the terminal 520. The base station 510 may transmit the downlink transmission to the terminal 520 without DS compensation. The terminal 620 may receive the downlink transmission from the base station 510 and obtain the DS feedback information including information indicating to ignore the estimated DS. The terminal 520 may determine that the base station 510 transmitted the downlink transmission to the terminal 520 without DS compensation between the base station 510 and the terminal 520. The terminal 520 may not consider the estimation, compensation, and/or the estimated DS information (i.e. obtained in the step S720 and/or strep S530 in the procedure B of FIG. 7) for the downlink transmission. Here, the estimated DS information (including estimated DS $f_d$) may be estimated DS information included in DS feedback information previously received before the DS feedback information including information indicating to ignore the estimated DS is received.

In another exemplary embodiment, the DS compensation condition at the terminal 520 may be a condition for determining whether the estimated speed V (or time-varying characteristic information corresponding to the speed) is greater than or equal to a speed threshold $T_V$ (i.e. $V \geq T_V$). It may be assumed that the speed V (or time-varying characteristic information corresponding to the speed) estimated by the terminal 520 is equal to or greater than the speed threshold $T_V$. If the estimated speed V is equal to or greater than the speed threshold $T_V$, the length $N_4$ of a basic vector (i.e. Doppler domain (DD)/time domain (TD)) may be expressed greater than 1 (i.e. $N_4>1$). Here, the speed threshold $T_V$ may be a predetermined value or a value configured by the base station 510.

In another exemplary embodiment, the base station 510 may determine that the speed feedback condition is satisfied at the terminal 520 based on the uplink transmission received from the terminal 520. When it is determined that the speed feedback condition is satisfied at the terminal 520, the base station 510 may perform estimation of a DS $f_d$ between the base including the estimated DS information in a downlink transmission to the terminal 520. Here, the estimated DS information may include the estimated DS $f_d$.

In another exemplary embodiment, the base station 510 may perform compensation for the estimated DS $f_d$ for the downlink transmission to the terminal 520 based on the estimated DS information, and transmit the downlink transmission to the terminal 520. The terminal 520 may consider the estimated DS information included in the obtained DS feedback information when performing estimation, compensation, and/or speed estimation (e.g. step S720 and/or step S530 in the procedure B in FIG. 7).

In the above-described exemplary embodiments, the above-described speed feedback information (or time-varying characteristic information corresponding to the speed) may be expressed as in Table 8.

TABLE 8

| VelocityFeedCondIndInfo ::= | SEQUENCE { |
|---|---|
| velocityFeedCondInd | BIT STRING (SIZE (1)), |
| ... | |
| } | |

Table 8 is an example showing an exemplary embodiment of speed feedback information.

Referring to Table 8, the speed feedback information VelocityFeedInfo (or time-varying characteristic information corresponding to the speed) may include an indicator velocityFeedCondInd indicating whether the speed feedback condition (i.e. the estimated speed V≥ a speed threshold $T_V$) is satisfied. The indicator velocityFeedCondInd indicating whether the speed feedback condition is satisfied may be expressed as 1 bit. If the speed V (or time-varying characteristic information corresponding to the speed) estimated by the terminal 520 is greater than or equal to the speed threshold $T_V$, the indicator velocityFeedCondInd may be set to '1' to indicate that the speed feedback condition is satisfied (i.e. V≥$T_V$). If the speed V (or time-varying characteristic information corresponding to the speed) estimated by the terminal 520 is less than the speed threshold $T_V$, the indicator velocityFeedCondInd may be set to '0' to indicate that the speed feedback condition is not satisfied (i.e. V<$T_V$).

In the above-described exemplary embodiments, the information indicating that the speed feedback condition is satisfied may correspond to the bit value '1' of the indicator velocityFeedCondInd indicating whether the speed feedback condition is satisfied. The information indicating that the speed feedback condition is not satisfied may correspond to the bit value '0' of the indicator velocityFeedCondInd indicating whether the speed feedback condition is satisfied. Table 8 is an example of speed feedback information and is not intended to limit the speed feedback information, but rather to describe the speed feedback information, and the speed feedback information is not limited to Table 8.

In the above-described exemplary embodiments, the above-described DS feedback information may be expressed as Table 9.

feedback information, but rather to describe the DS feedback information, and the DS feedback information is not limited to Table 9.

In the above-described exemplary embodiments, the information indicating to ignore of the estimated DS may correspond to the indicator cfoIgnoreCompensationInd indicating to ignore the estimated DS. The estimated DS Δf may correspond to the estimated DS value dsEstimatedValue.

Hereinafter, a method for the base station to compensate for the estimated DS in the frequency domain will be described. For convenience of description, it is assumed that four subcarrier resources are allocated and used as shown in FIG. 6. However, in an actual communication environment, a much larger number of subcarrier resources may be allocated and used.

An uplink transmission from a terminal m (1≤m≤K, where K is the number of terminals connected to the base station) may be expressed as a data vector $d_m$ in the frequency domain as in Equation 11 described above, and a compensation matrix $Q_m$ may be expressed as Equation 14 below. In addition, for the terminal m, an uplink transmission with a frequency offset compensated in the frequency domain may be expressed as a vector $\tilde{d}_m$ as shown in Equation 15.

$$Q_m = \begin{bmatrix} Q_{11,m} & Q_{12,m} & Q_{13,m} & Q_{14,m} \\ Q_{21,m} & Q_{22,m} & Q_{23,m} & Q_{24,m} \\ Q_{31,m} & Q_{32,m} & Q_{33,m} & Q_{34,m} \\ Q_{41,m} & Q_{42,m} & Q_{43,m} & Q_{44,m} \end{bmatrix} \quad \text{[Equation 14]}$$

$Q_{il,m} = e^{\pm j\varphi_{il},ds,m}$ for $i, l = 1, 2, 3, 4$ $$\tilde{d}_m = Q_m d_m \quad \text{[Equation 15]}$$

Referring to Equation 15, the data vector $\tilde{d}_m$ may represent downlink transmission for which the DS $f_{d,m}$ estimated for the terminal m is compensated in the frequency domain. If the data vector $\tilde{d}_m$ is transmitted in an arbitrary frequency resource that is distinct for each terminal, the data vector $\tilde{d}_m$

TABLE 9

| DsFeedbackInfo ::= | SEQUENCE { |
|---|---|
| dsIgnoreCompensationInd | ENUMERATED { true }, |
| dsEstimatedInfo | dsEstimatedInfo, |
| ... | |
| } | |
| DsEstimatedInfo ::= | SEQUENCE { |
| dsEstimatedValue | INTEGER (minDsEstimatedValue..maxDsEstimatedValue), |
| ... | |
| } | |
| minDsEstimatedValue | INTEGER ::= −1024 |
| maxDsEstimatedValue | INTEGER ::= 1024 |

Table 9 is an example showing an exemplary embodiment of DS feedback information.

Referring to Table 9, DS feedback information DsFeedbackInfo may include an indicator dsIgnoreCompensationInd indicating to ignore the estimated DS or estimated DS information dsEstimatedInfo. Here, the estimated DS information dsEstimatedInfo may include the estimated DS dsEstimatedValue. The estimated DS dsEstimatedValue may be a value between the minimum estimated DS value minDsEstimatedValue and the maximum estimated DS value maxDsEstimatedValue. Table 9 is an example of DS feedback information and is not intended to limit the DS may not affect other frequency resources. Equivalently, in the frequency domain, the downlink transmission for the terminal m may be compensated by the estimated DS $f_{d,m}$.

Proposal 3: Wireless Backhaul-Based DS Compensation Method and Procedure

The third proposal ('wireless backhaul-based DS compensation method and procedure') may prevent a Doppler shift and frequency offset between the base station and the terminal from affecting uplink transmissions when a wireless backhaul (WB) exists between the base station and the terminal. Here, it is assumed that wireless backhaul can distinguish and estimate the CFO and DS. As previously described, estimation of a sum of the CFO and DS may be referred to as frequency offset (FO) estimation.

Figure 8:
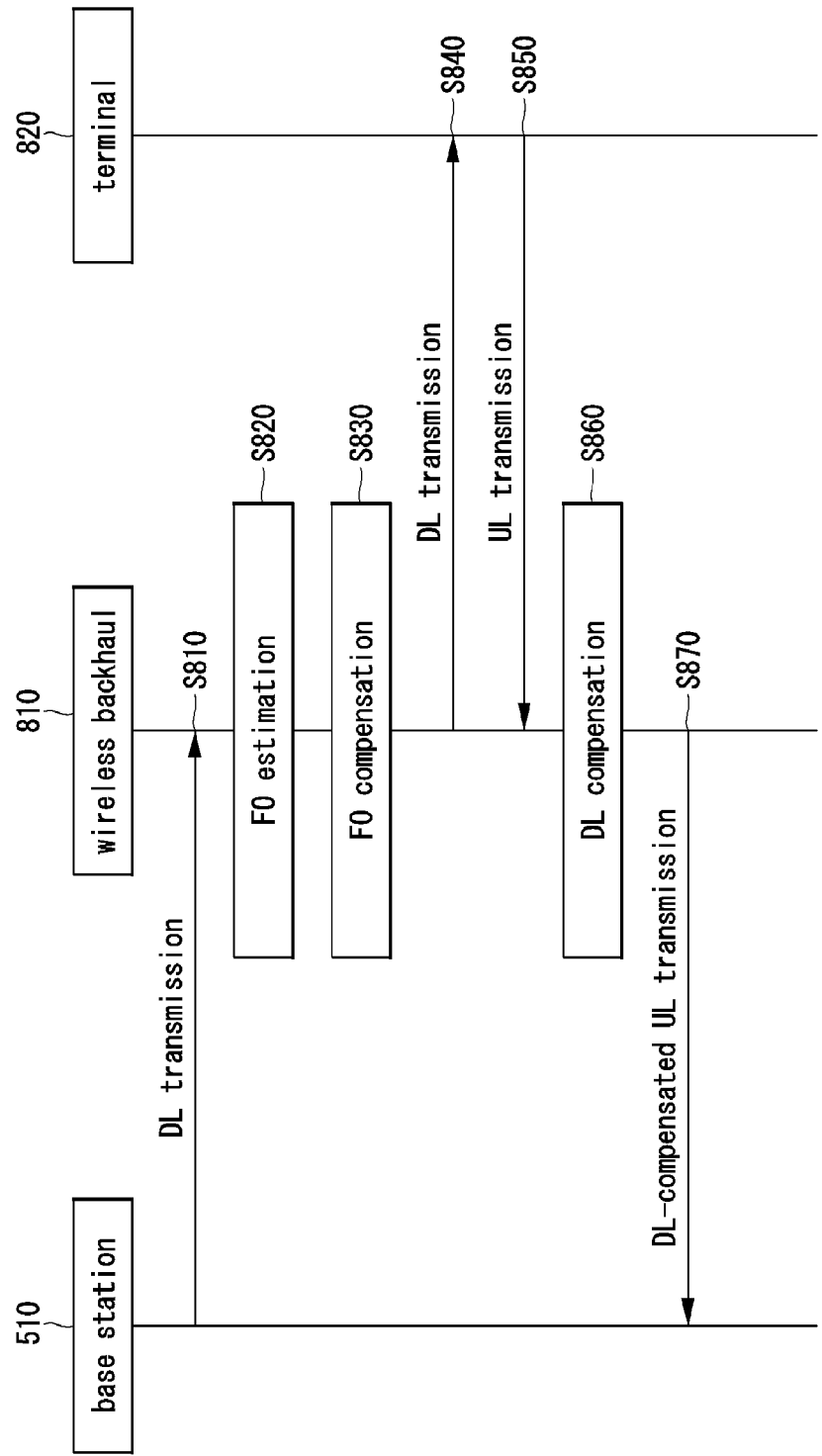
FIG. 8 is a sequence chart illustrating a wireless backhaul-based Doppler shift compensation method and procedure according to an exemplary embodiment of the present disclosure.

FIG. 8 is a sequence chart illustrating a wireless backhaul-based Doppler shift compensation method and procedure according to an exemplary embodiment of the present disclosure.

Referring to FIG. 8, a communication system may include a base station 510, a wireless backhaul 910, a terminal 520, and the like. The wireless backhaul 910 may be located between the base station 510 and the terminal 520, may transmit a downlink transmission from the base station 510 to the terminal 520, and may transmit an uplink transmission from the terminal 520 to the base station 510. The base station 510 may transmit a downlink transmission to the wireless backhaul 910 to estimate a FO $f_{cfod}$ between the base station 510 and the wireless backhaul 910. The wireless backhaul 910 may estimate the FO $f_{cfod}$ based on the downlink transmission received from the base station 510. The wireless backhaul 910 may compensate for the downlink transmission of the base station 510 transmitted to the terminal 520 based on the estimated FO $f_{cfod}$, and transmit the compensated downlink transmission of the base station to the terminal 520. Additionally, the wireless backhaul 910 may compensate for the uplink transmission transmitted from the terminal 520 to the base station 510 based on the estimated DS $f_d$. The wireless backhaul 910 may transmit the compensated uplink transmission of the terminal 520 to the base station 620. Here, the wireless backhaul 910 may refer to a wireless backhaul device. The downlink transmission to estimate FO $f_{cfod}$ between the base station 510 and the wireless backhaul 910 may include a synchronization signal and/or reference signal to estimate the CFO and DS between the base station 510 and the wireless backhaul 910. The downlink transmission transmitted by the wireless backhaul 910 to the terminal 520 may include a data channel (e.g. PDSCH) and/or a control channel (e.g. PDCCH). The uplink transmission of the terminal 520 transmitted by the wireless backhaul 910 to the base station 510 may include a data channel (e.g. PUSCH) and/or a control channel (e.g. PUCCH).

In a step S810, the base station 510 may transmit the downlink transmission for estimating the CFO $\Delta_f$ and DS $f_d$ between the base station 510 and the wireless backhaul 910 to the wireless backhaul 910. The wireless backhaul 910 may receive the downlink transmission from the base station 510 for estimating the CFO $\Delta_f$ and DS $f_d$ between the base station 510 and the wireless backhaul 910. Here, as described above, the downlink transmission may include a synchronization signal and a reference signal used to estimate the CFO and DS between the base station 510 and the wireless backhaul 910.

In a step S820, the wireless backhaul 910 may perform estimation of the FO $f_{cfod}$ between the base station 510 and the wireless backhaul 910 based on the downlink transmission received from the base station 510. The FO $f_{cfod}$ may be estimated as a sum of the CFO Of and DS $f_d$ between the base station 510 and the wireless backhaul 910, and the CFO $\Delta f$ and DS $f_d$ may be estimated separately. Here, the CFO $\Delta f$, DS $f_d$, and FO $f_{cfod}$ between the base station 510 and the wireless backhaul 910 may be estimated by a predefined method.

In steps S830 and S840, the wireless backhaul 910 may perform compensation for the downlink transmission of the base station 510 based on the estimated FO $f_{cfod}$ (S830). The wireless backhaul 910 may transmit the compensated downlink transmission of the base station 510 to the terminal 520. The terminal 520 may receive the downlink transmission of the base station 510 for which the estimated FO $f_{cfod}$ is compensated from the wireless backhaul 910 (S840).

In the step S830, the wireless backhaul may compensate for the estimated FO $f_{cfod}$ using hardware or software. The software method of compensating for the estimated FO $f_{cfod}$ may be expressed as Equation 16 as a baseband signal in the time domain.

$$s_{b,WB,DL}(n) = s_{WB,DL}(n)e^{j\frac{\pm 2\pi f_{cfod} n}{N}}, \quad \text{[Equation 16]}$$
$$n = 0, 1, 2, \ldots, N-1$$

Here, $s_{b,WB,DL}(n)$ represents a baseband signal in the time domain for which the estimated FO f cfod is compensated, and $s_{b,WB,DL}(n)$ represents a baseband signal in the time domain for the downlink transmission transmitted by the wireless backhaul. Here, n represents a sample index, and N represents the size of the IFFT (corresponding to one valid OFDM symbol).

As previously described, in Equation 16, a CP may be excluded for one OFDM symbol. This is merely for convenience of description, and the present disclosure is not limited thereto.

In steps S850 to S870, the wireless backhaul 910 may receive the uplink transmission transmitted from the terminal 520 to the base station 910 (S850), and the wireless backhaul 910 may perform compensation for the uplink transmission received from the terminal 520 based on DS f d estimated between the base station 710 and the wireless backhaul (S860). The wireless backhaul 910 may transmit the uplink transmission of the terminal 520 for which the estimated DS f d is compensated to the base station 510, and the base station 510 may receive the uplink transmission of the terminal 520 from the wireless backhaul 910 for which the estimated DS is compensated (S870).

In the step S870, the uplink transmission of the terminal 520, which the wireless backhaul 910 transmits to the base station 510, may include a data channel (e.g. PUSCH) and/or a control channel (e.g. PUCCH), as described above.

Meanwhile, in the Proposal 3 of the present disclosure, the FO $f_{cfod}$ estimated in the frequency domain may be compensated as follows.

Figure 9:
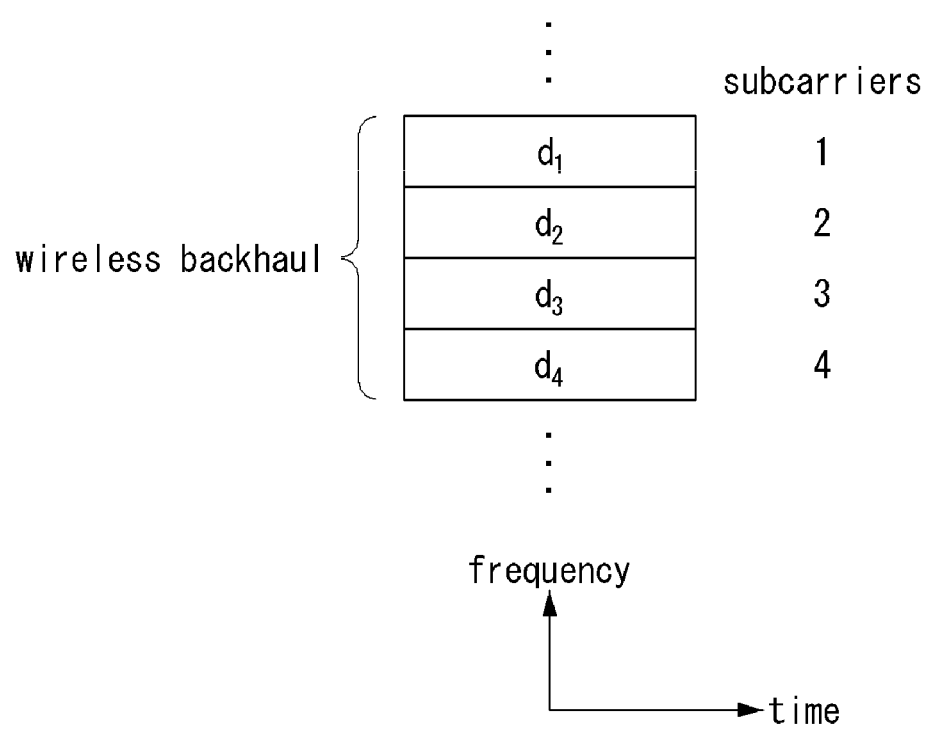
FIG. 9 is a conceptual diagram illustrating a method of compensating for a frequency offset of a wireless backhaul in the frequency domain according to an exemplary embodiment of the present disclosure.

FIG. 9 is a conceptual diagram illustrating a method of compensating for a frequency offset of a wireless backhaul in the frequency domain according to an exemplary embodiment of the present disclosure.

Referring to FIG. 9, a plurality of subcarrier resources (i.e. subcarriers 1 to 4) may be allocated to data in a wireless backhaul in the frequency domain. The data to which a plurality of subcarrier resources are allocated may be expressed as a vector d. Compensation in the frequency domain may be expressed as a compensation matrix F, and the compensation matrix F may refer to a matrix that compensates for the FO of the wireless backhaul in the frequency domain. The data in the wireless backhaul may be compensated in the frequency domain, and the data compensated in the frequency domain may be expressed as a vector $\tilde{d}$. The vector $\tilde{d}$ may be expressed as a product of the vector d and the compensation matrix F (i.e. $\tilde{d}=Fd$). For convenience of description, four subcarrier resources (i.e. subcarriers 1 to 4) are shown in FIG. 9, but the present disclosure is not limited thereto.

The downlink transmission transmitted from the base station to the wireless backhaul may be expressed as Equation 17 as the vector d in the frequency domain, and the compensation matrix F may be expressed as Equation 18. In addition, the downlink transmission for which the estimated FO $f_{cfod}$ is compensated at the wireless backhaul may be expressed as the vector $\tilde{d}$ as shown in Equation 19.

$$d = \begin{bmatrix} d_1 \\ d2 \\ d3 \\ d4 \end{bmatrix}$$ [Equation 17]

$$F = \begin{bmatrix} F_{11} & F_{12} & F_{13} & F_{14} \\ F_{21} & F_{22} & F_{23} & F_{24} \\ F_{31} & F_{32} & F_{33} & F_{34} \\ F_{41} & F_{42} & F_{43} & F_{44} \end{bmatrix}$$ [Equation 18]

Here, $F_{i,l} = e^{j\frac{\pm if_{il,cfod}}{N}}, i, l = 0, 1, 2, 3, 4$ $$\tilde{d} = Fd$$ [Equation 19]

Referring to Equation 19, the vector $\tilde{d}$ may represent the downlink transmission of the base station for which the FO $f_{cfod}$ estimated for the downlink transmission of the base station is compensated in the wireless backhaul in the frequency domain. When the vector d is transmitted by the wireless backhaul in an arbitrary frequency resource, the estimated FO $f_{cfod}$ may be equivalently compensated in the frequency domain without affecting other frequency resources.

When Proposal 3 ('wireless backhaul-based DS compensation method and procedure') according to the present disclosure is used, downlink transmissions from the base station and uplink transmissions from the terminal are transmitted and received without impacts of CFO and DS even under a condition where the CFO and DS coexist. Additionally, Proposal 1 and/or 2 described above may be applied together with Proposal 3.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a terminal, comprising:
receiving a first downlink (DL) transmission from a base station;
estimating a first frequency offset (FO) based on the first DL transmission;
estimating first time-varying characteristic information based on the first DL transmission;
transmitting, to the base station, a first uplink (UL) transmission including time-varying characteristic feedback information based on the first time-varying characteristic information and a configured time-varying characteristic information feedback condition;
receiving, from the base station, a second DL transmission including Doppler shift (DS) feedback information generated in consideration of the time-varying characteristic feedback information; and
performing a reception operation for a third DL transmission based on the Doppler shift feedback information included in the second DL transmission.

2. The method according to claim 1, wherein the first DL transmission includes at least one of a synchronization signal (SS), a reference signal (RS), a data channel, or a control channel, and at least one of the SS or RS included in the first DL transmission is used to estimate the first FO.

3. The method according to claim 2, wherein at least one of the SS or RS included in the first DL transmission is compensated based on the first FO.

4. The method according to claim 1, wherein the first FO is estimated as a sum of a carrier frequency offset (CFO) in the first DL transmission and a Doppler shift (DS) in the first DL transmission.

5. The method according to claim 1, wherein the time-varying characteristic information feedback condition is a condition for determining whether the first time-varying characteristic information is greater than or equal to a time-varying characteristic information threshold, and the time-varying characteristic information threshold is a predetermined value or a value set by the base station.

6. The method according to claim 1, wherein the first UL transmission includes at least one of a preamble, a reference signal, a data channel, or a control channel.

7. The method according to claim 1, wherein the time-varying characteristic feedback information indicates whether the time-varying characteristic information feedback condition is satisfied, and the time-varying characteristic feedback information is included in a data channel or control channel included in the first UL transmission.

8. The method according to claim 1, wherein when the DS feedback information includes information on an estimated DS, the second DL transmission is compensated based on the estimated DS and transmitted to the terminal.

9. The method according to claim 1, wherein when the DS feedback information includes information indicating to ignore an estimated DS, the second DL transmission is transmitted to the terminal without compensation for a DS between the base station and the terminal.

10. A method of a terminal, comprising:
receiving a first downlink (DL) transmission from a base station;
estimating a first frequency offset (FO) based on the first DL transmission;
transmitting, to the base station, a first uplink (UL) transmission frequency pre-shifted by twice the first FO;
receiving, from the base station, a second DL transmission including carrier frequency offset (CFO) feedback information; and
performing a reception operation for a third DL transmission based on the CFO feedback information included in the second DL transmission.

11. The method according to claim 10, wherein the first DL transmission includes at least one of a synchronization signal (SS), a reference signal (RS), a data channel, or a control channel, and at least one of the SS or RS included in the first DL transmission is used to estimate the first FO.

12. The method according to claim 11, wherein at least one of the SS or RS included in the first DL transmission is compensated based on the first FO.

13. The method according to claim 10, wherein the first FO is estimated as a sum of a carrier frequency offset (CFO) in the first DL transmission and a Doppler shift (DS) in the first DL transmission.

14. The method according to claim 10, wherein the first UL transmission includes at least one of a preamble, a reference signal, a data channel, or a control channel.

15. The method according to claim 10, wherein the CFO feedback information includes at least one of information indicating to ignore an estimated CFO or information on the estimated CFO, and the CFO feedback information is included in a data channel included in the second DL transmission.

16. The method according to claim 10, wherein when the CFO feedback information includes information indicating to ignore an estimated CFO, the second DL transmission is transmitted to the terminal without compensation for a CFO between the base station and the terminal.

17. A method of a base station, comprising:
transmitting a first downlink (DL) transmission to a terminal;
receiving a first uplink (UL) transmission including time-varying characteristic feedback information from the terminal;
estimating a Doppler shift (DS) based on the time-varying characteristic feedback information;
transmitting, to the terminal, a second DL transmission including DS feedback information generated in consideration of the time-varying characteristic feedback information; and
transmitting, to the terminal, a third DL transmission based on the DS feedback information included in the second DL transmission.

18. The method according to claim 17, wherein the first DL transmission includes at least one of a synchronization signal (SS), a reference signal (RS), a data channel, or a control channel.

19. The method according to claim 17, wherein the DS feedback information includes at least one of estimated DS information including an estimated DS or information indicating to ignore an estimated DS.

20. The method according to claim 19, wherein when the DS feedback information includes information indicating to ignore an estimated DS, the second DL transmission is transmitted to the terminal without compensation for a DS between the base station and the terminal.

* * * * *